United States Patent
Puliatti et al.

(10) Patent No.: US 8,989,791 B1
(45) Date of Patent: Mar. 24, 2015

(54) SYSTEMS AND METHODS OF TALK GROUP COMMUNICATION

(71) Applicant: Sprint Spectrum LP, Overland Park, KS (US)

(72) Inventors: Dante Puliatti, Shawnee, KS (US); Samuel Schanker, Overland Park, KS (US); Rick Bassett, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 251 days.

(21) Appl. No.: 13/706,237

(22) Filed: Dec. 5, 2012

(51) Int. Cl.
  *H04B 7/00* (2006.01)
  *H04W 4/10* (2009.01)

(52) U.S. Cl.
  CPC ..................................... *H04W 4/10* (2013.01)
  USPC .................. 455/519; 455/90.2; 455/550.1

(58) Field of Classification Search
  USPC ............................. 455/90.2, 517–519, 550.1
  See application file for complete search history.

(56) References Cited

U.S. PATENT DOCUMENTS

| | | | |
|---|---|---|---|
| 6,240,402 B1 * | 5/2001 | Lynch-Aird | 705/400 |
| 7,738,861 B2 | 6/2010 | Fournier | |
| 7,941,171 B2 | 5/2011 | Vempati et al. | |
| 2005/0143135 A1 * | 6/2005 | Brems et al. | 455/564 |

* cited by examiner

*Primary Examiner* — Nhan Le (57) ABSTRACT

In systems and methods of talk group communication, a group PTT call is established between a originating wireless device and recipient wireless devices. A group identifier of the PTT call group is provided to the recipient wireless devices indicating that the PTT call involves a call group without indicating an identifier of originating wireless device. In an embodiment, when the group PTT call is terminated, a response call request is received based on the group PTT call from one of the plurality of recipients and a bilateral PTT call is established between the one of the plurality of recipients and the originating wireless device. In an embodiment, a response is received based on the group PTT call from one of the plurality of recipients, the group PTT call is terminated, and a bilateral PTT call is established between the one of the plurality of recipients and the originating wireless device.

15 Claims, 8 Drawing Sheets

SYSTEMS AND METHODS OF TALK GROUP COMMUNICATION

TECHNICAL BACKGROUND

Communication systems can support a variety of communications services including interconnect communication, short message service, packet data communications and dispatch communications. Interconnect communication is typically full duplex communication or bilateral communication, allowing participants to simultaneously talk and hear the other party. An example of interconnect communication is a traditional cellular telephone call. Dispatch services (also referred to as "push-to-talk" (PTT) or "walkie-talkie" type communications) are typically half-duplex communications in which one communication device is granted the ability to transmit while another communication device may receive the transmission. Group PTT calls involving more than two participants are also possible. When a group PTT call is established, participants can be brought into the call session and remain until the group PTT call terminates. After the termination of the group PTT call, if a participant responds to the group PTT call, communication sessions can be re-established with all of the participants of the group PTT call.

BACKGROUND

In operation, a group PTT call is established between a originating wireless device and recipient wireless devices. A group identifier of the PTT call group is provided to the recipient wireless devices indicating that the PTT call involves a call group without indicating an identifier of originating wireless device. In an embodiment, when the group PTT call is terminated, a response call request is received based on the group PTT call from one of the plurality of recipients and a bilateral PTT call is established between the one of the plurality of recipients and the originating wireless device. In an embodiment, a response is received based on the group PTT call from one of the plurality of recipients, the group PTT call is terminated, and a bilateral PTT call is established between the one of the plurality of recipients and the originating wireless device.

DETAILED DESCRIPTION

Figure 1:
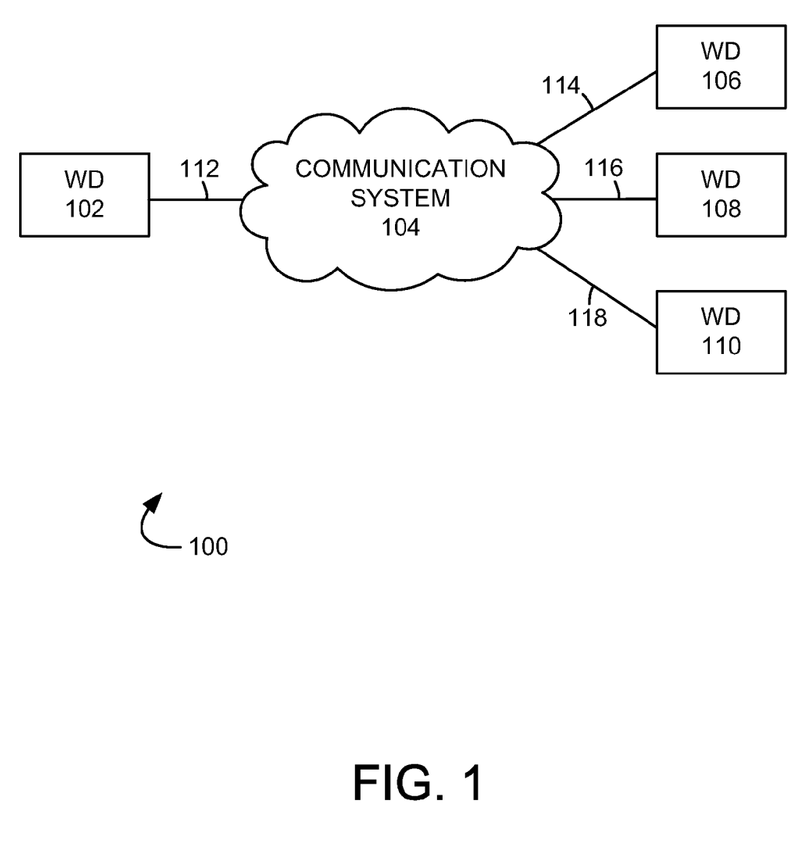
FIG. 1 illustrates an exemplary communication system for talk group communication.

FIG. 1 illustrates an exemplary communication system 100 for talk group communication comprising wireless device 102, communication network 104, and wireless devices 106, 108 and 110. Examples of wireless devices 102, 106, 108 and 110 can comprise a cell phone, a smart phone, a computing platform such as a laptop, palmtop, or tablet, a personal digital assistant, or an internet access device, including combinations thereof. Wireless device 102 is in communication with communication system 104 over communication link 112. Wireless devices 106, 108 and 110 are in communication with communication system 104 over communication links 114, 116 and 118, respectively.

Communication system 104 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication system 104 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication system 104 may also comprise a wireless network, including base stations, wireless communication nodes, telephony switches, internet routers, network gateways, computer systems, communication links, or some other type of communication equipment, and combinations thereof.

Communication system 104 can support a variety of communications services including interconnect communication, short message service, packet data communications and dispatch communications. Interconnect communication is typically full duplex communication or bilateral communication, allowing participants to simultaneously talk and hear the other party. An example of interconnect communication is a traditional cellular telephone call. Dispatch services (also referred to as "push-to-talk" (PTT) or "walkie-talkie" type communications) are typically half-duplex communications, and can be supported, for example, as an Internet protocol (IP) application served by a dispatch server. Typically, PTT communications are initiated by an originating wireless device selecting a recipient wireless device and sending a call request. The call request is received by an access node (such as a base transceiver station or an enhanced node B device) and routed to a push-to-talk call controller (such as a PTT server) which locates a target subscriber and routes the call request to an access node which can communicate with the recipient wireless device. Because of the half-duplex nature of a PTT call, a floor control system may govern which party can talk at any time, where received audio is muted for the subscriber having the PTT floor. A wireless device may relinquish the PTT floor, or under certain conditions floor control may be pre-empted and released by the PTT call controller, and another party to the PTT call may be granted the floor.

A PTT call can also be a group call. Group PTT calls can involve communication among more than two individuals. A PTT call group can be organized, for example, by the assignment of a group identifier, the use of which permits a call request to be sent for each of the other members of the group. Initiating a group call may involve the establishment of a plurality of one-to-one, communication sessions among the members of the PTT group, such as unicast communications. For example, certain communication protocols and/or access technologies may not enable a PTT broadcast transmission to a plurality of recipient wireless devices, requiring the establishment of a plurality of one-to-one communication sessions among the members of the PTT group. The use of one-to-one communications for group calls typically consumes a greater amount of air interface and network resources than an interconnect call, particularly with relatively larger numbers of group members. Further, while the group PTT call is ongoing, each of the one-to-one communication sessions is typically maintained by the communication system, thus committing resources to the group PTT call.

Communication links 112, 114, 116 and 118 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as access nodes (for example, base stations, base station controllers, and/or eNode B devices), routers, gateways, mobile switching centers, dispatch application processors, and location registers such as a home location register or visitor location register, and physical and/or wireless data links for carrying data among the various network elements.

In operation, a group PTT call is established between originating wireless device 102 and recipient wireless devices 106, 108 and 110. A group identifier of the PTT call group is provided to recipient wireless devices 106, 108 and 110 indicating that the PTT call involves a call group comprising the originator 102 and the plurality of recipients 106, 108, and 110 without indicating an identifier of originating wireless device 102. When the group PTT call is terminated, a response call request is received based on the group PTT call from one of the plurality of recipients 106, 108, and 110. A bilateral PTT call is established between the one of the plurality of recipients 106, 108, and 110, and the originator 102.

Figure 2:
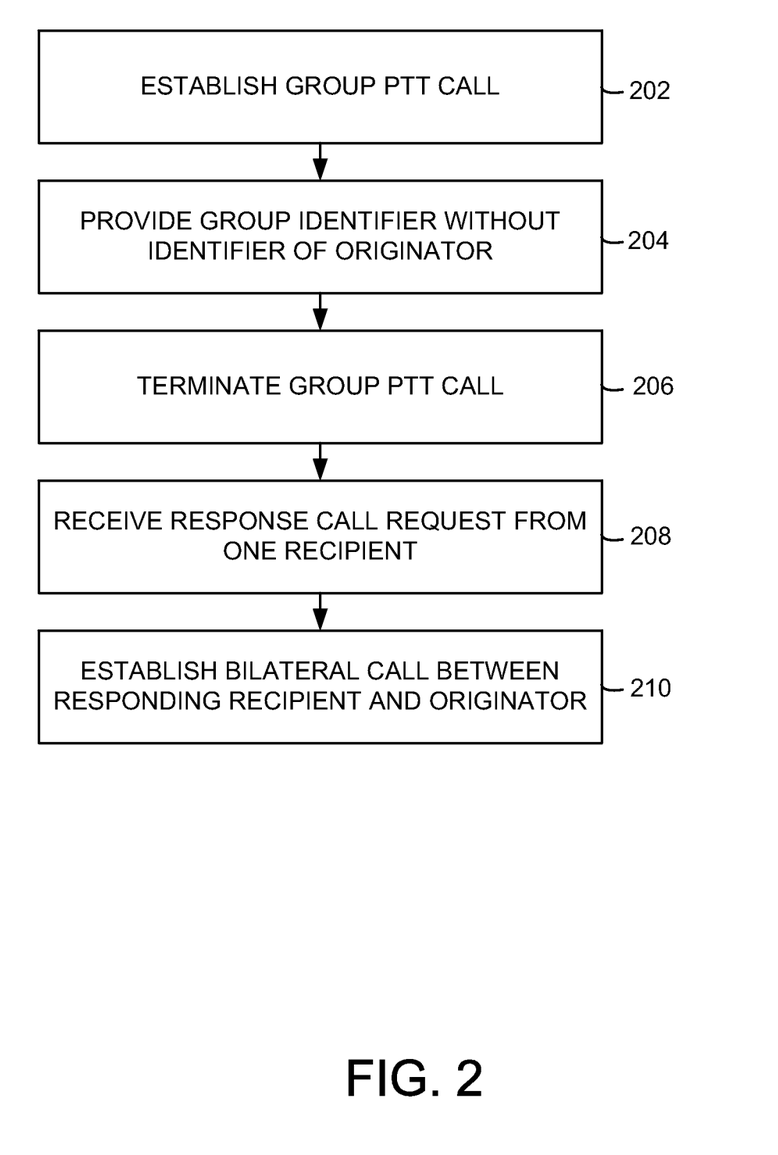
FIG. 2 illustrates an exemplary method of talk group communication.

FIG. 2 illustrates an exemplary method of talk group communication. In operation 202, a group push-to-talk (PTT) call is established between an originator and a plurality of recipients. For example, wireless device 102 can establish a group call with a plurality of recipients comprising wireless devices 106, 108 and 110. In an embodiment, the group PTT call can be established by wireless device 102 by the use of a group identifier associated with wireless devices 102, 106, 108, and 110.

In operation 204, a group identifier is provided to the plurality of recipients indicating that the group PTT call involves a call group comprising the originator and the plurality of recipients without indicating an identifier of the originator. For example, the group identifier can be provided to wireless devices 106, 108, and 110, while an identifier of the originator, wireless device 102, is not provided to wireless devices 106, 108, and 110. In operation 206, the group PTT call is terminated. In an embodiment, when the group PTT call is terminated, each of the one-to-one communication sessions with each of wireless device 102, 106, 108 and 110 are terminated.

After the termination of the group PTT call, a call request responsive to the group PTT call is received from one of the plurality of recipients (operation 208). For example, a PTT call request can be received from one of wireless device 106, 108, and 110. Because an identifier of the originator was not provided, the PTT call request from wireless device 106, 108 or 110 typically can comprise the group identifier. However, a network element of communication system 104, such as a call controller, a gateway, or another element of communication system 104, can store, for example, information indicating that wireless device 102 was the originator of the group PTT call to which the PTT call request from wireless device 106, 108 or 110 is responsive, in which case the PTT call request need not comprise the group identifier. For example, the PTT call request received from wireless device 108, 108 or 110 can comprise an identifier of the wireless device sending the PTT call request, and a network element of communication system 104 can receive the PTT call request and can correlate the wireless device identifier as a participant in the terminated group PTT call.

In operation 210, a bilateral call is established between the responding recipient and the originator. For example, when a PTT call request is received from wireless device 106, a bilateral (full duplex) communication session can be established between wireless device 106 and wireless device 102. Establishing a bilateral call or a bilateral communication session can prevent the establishment of a second group PTT call, and can preserve the network resources that would otherwise be committed to establishing a second group PTT call among the call group.

Figure 3:
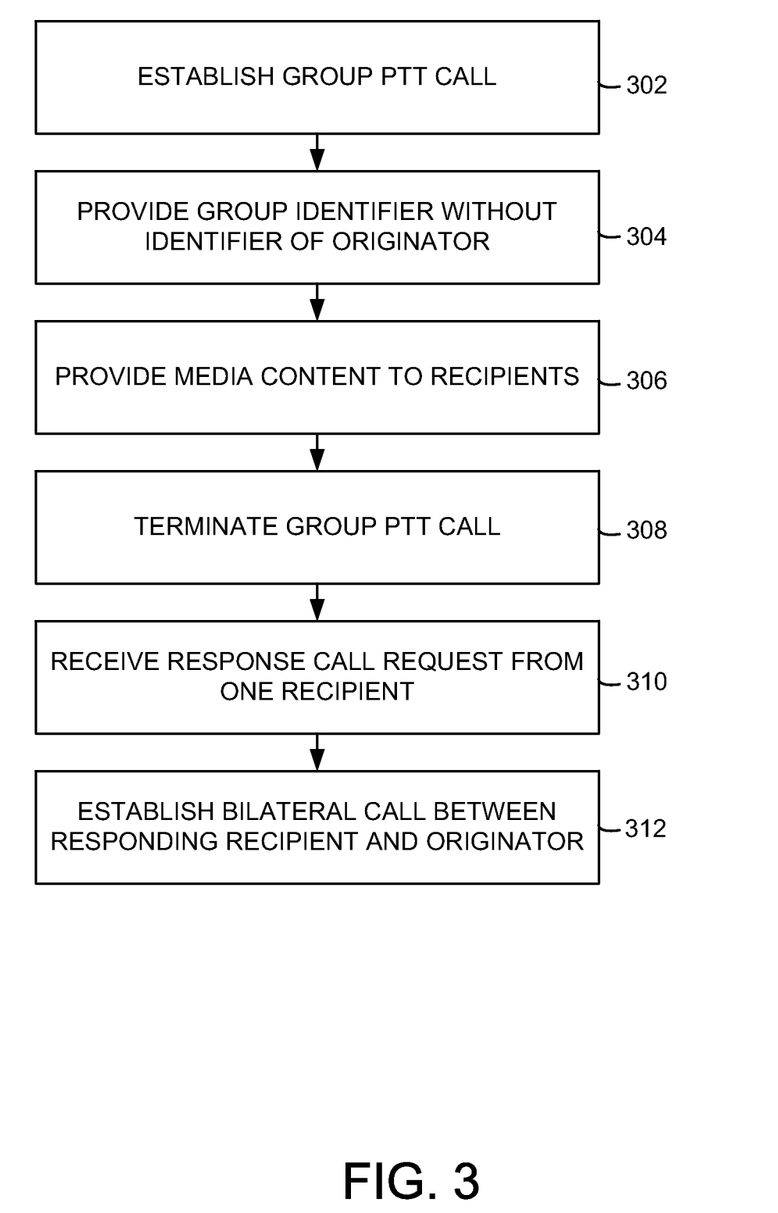
FIG. 3 illustrates another exemplary method of talk group communication.

FIG. 3 illustrates another exemplary method of talk group communication. In operation 302, a group push-to-talk (PTT) call is established between an originator and a plurality of recipients. For example, wireless device 102 can establish a group call with a plurality of recipients comprising wireless devices 106, 108 and 110. In an embodiment, the group PTT call can be established by wireless device 102 by the use of a group identifier associated with wireless devices 102, 106, 108, and 110.

In operation 304, a group identifier is provided to the plurality of recipients indicating that the group PTT call involves a call group comprising the originator and the plurality of recipients without indicating an identifier of the originator. For example, the group identifier can be provided to wireless devices 106, 108, and 110, while an identifier of the originator, wireless device 102, is not provided to wireless devices 106, 108, and 110.

In operation 306, media content can be provided to the plurality of recipients. For example, originating wireless device 102 can send media content to the plurality of recipient wireless devices 106, 108 and 110. Media content can comprise audio, video, multimedia, or other information in digital form. In an embodiment, the sending of the media content by originating wireless device 102 can be a broadcast of the media content to recipient wireless devices 106, 108 and 110. In an embodiment, the receipt of the group identifier without an identifier of the originating wireless device can indicate that the media content is being sent to a group (such as the call group).

In an embodiment, originating wireless device 102 may not expect a response from recipient wireless devices 106, 108 and 110, or wireless device 102 may intend for wireless devices 106, 108, and 110 not to respond. For example, originating wireless device 102 may provide an indication (such as with a call request from wireless device 102, or related to the sending of the media content) that wireless device 102 does not expect a response to the call request or to the sending of the media content. As another example, wireless device 102 may provide an indication, for example, with a call request from wireless device 102, or related to the sending of the media content, that wireless device 102 intends or requests that recipient wireless devices 106, 108 and 110 do not respond to the call request or to the sending of the media content. The indication provided by wireless device 102 may be received by a network element of communication system 104, for example, a call controller, a gateway, or some other element of communication system 104. The indication provided by wireless device 102 may also be provided to recipient wireless device 106, 108 and 110.

In operation 308, the group PTT call is terminated. In an embodiment, when the group PTT call is terminated, each of the one-on-one communication sessions with each of wireless device 102, 106, 108 and 110 are terminated. In an embodiment, the group PTT call can be terminated following the provision of the media content to each of wireless device 106, 108 and 110. For example, each of wireless device 106, 108 and 110 can send an acknowledgement of the media content to a network element of communication system 104, such as a call controller or a gateway. Upon receiving the acknowledgements, the group PTT call can be terminated. In an embodiment, the communication session between wireless device 102 and each of wireless devices 106, 108 and 110 can be terminated individually after the receipt of an acknowledgement of the media content from each of wireless devices 106, 108 and 110, respectively. In an embodiment, the group PTT call can be maintained until all of the recipient wireless devices have acknowledged the media content, after which all of the communication sessions between the originator wireless device and the recipient wireless devices can be terminated.

In operation 310, after the termination of the group PTT call, a call request responsive to the group PTT call is received from one of the plurality of recipients. For example, a PTT call request can be received from one of wireless device 106, 108, and 110. Because an identifier of the originator was not provided, the PTT call request from wireless device 106, 108 or 110 typically will comprise the group identifier, and may not comprise an identifier of originating wireless device 102. However, a network element of communication system 104, such as a call controller, a gateway, or another element of communication system 104, can store, for example, information indicating that wireless device 102 was the originator of the group PTT call to which the PTT call request from wireless device 106, 108 or 110 is responsive.

In operation 312, a bilateral call is established between the responding recipient and the originator. For example, when a PTT call request is received from wireless device 106, a bilateral, full duplex communication session can be established between wireless device 106 and wireless device 102. Establishing a bilateral call or a bilateral communication session can prevent the establishment of a second group PTT call, and can preserve the network resources that would otherwise be committed to establishing a second group PTT call among the call group.

In an embodiment, a second group PTT call can be prevented. For example, based on the indication received from originating wireless device 102 that a response is not expected (or that wireless devices 106, 108 and 110 are requested to not respond) a network element of communication system 104 can prevent a second group PTT call from being established in response to the group PTT call request from one of wireless device 104, 106 or 108. In an embodiment, when a PTT call request is received from a recipient wireless device (e.g., wireless device 106), a group PTT call can be prevented, and a bilateral (full duplex) communication session can be established between wireless device 106 and wireless device 102.

Figure 4:
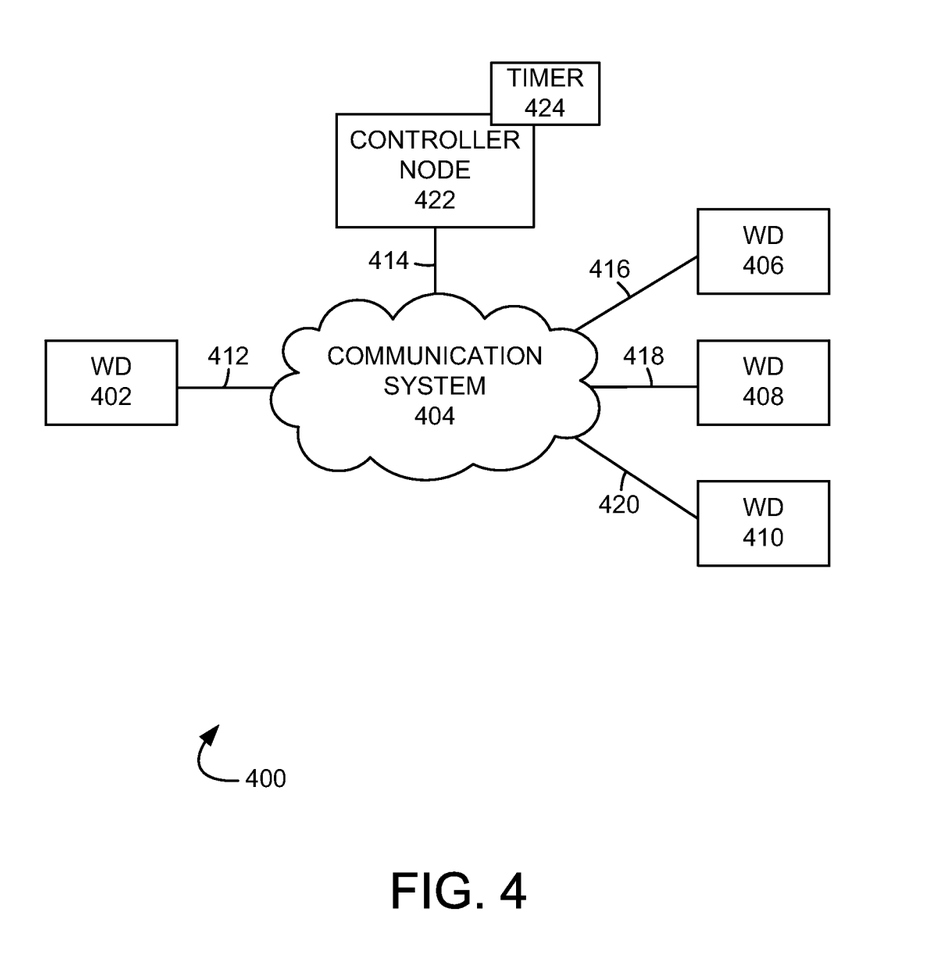
FIG. 4 illustrates another exemplary system for talk group communication device.

FIG. 4 illustrates another exemplary system for talk group communication device comprising wireless devices 402, 406, 408 and 410, communication system 404, and controller node 422. Examples of wireless devices 402, 406, 408 and 410 can comprise a cell phone, a smart phone, a computing platform such as a laptop, palmtop, or tablet, a personal digital assistant, or an internet access device, including combinations thereof. Wireless devices 402, 406, 408 and 410 are in communication with communication system 404 over communication links 412, 416, 418 and 420, respectively.

Communication system 404 can be a wired and/or wireless communication network comprising processing nodes, routers, gateways, and physical and/or wireless data links for carrying data among various network elements, including combinations thereof, and can include a local area network, a wide area network, and an internetwork (including the Internet). Communication system 404 may also comprise base stations, wireless communication nodes, telephony switches, internet routers, network gateways, computer systems, communication links, or some other type of communication equipment, and combinations thereof. Communication system 404 may use wireless and wired network protocols.

Communication system 404 can support a variety of communications services including interconnect communication, short message service, packet data communications and dispatch communications. Dispatch communications can comprise a group PTT call which can be organized, for example, by the assignment of a group identifier, the use of which permits a call request to be sent for each of the other members of the group. Initiating a group call typically involves the establishment of a plurality of unicast, or one-to-one, communication sessions among the members of the PTT group. The use of unicast communications for group calls typically consumes a greater amount of air interface and network resources than an interconnect call, particularly with relatively larger numbers of group members. Further, while the group PTT call is ongoing, each of the one-to-one communication sessions is typically maintained by the communication system, thus committing resources to the group PTT call.

Controller node 422 is a network element in communication with communication system 404 over communication link 414. Controller node 422 can comprise a processor and associated circuitry to execute or direct the execution of computer-readable instructions related to talk group communication. Controller node 422 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 422 can receive instructions and other input at a user interface. Examples of control node 422 can include a standalone computing device, a computer system, or a network component, including a dispatch call controller, a call session control function (CSCF), a mobility management entity (MME), and the like.

Controller node 422 can comprise timer 424. Timer 424 can measure a time that a group PTT call is established, and can provide an indication to call controller 422 when a predetermined period of time elapses without any communication occurring in an established group PTT call. A group PTT call can be terminated when timer 424 provides the indication to controller node 422. Controller node 422 can be configured to disregard the indication from timer 424. Controller node 422 can also be configured to disable timer 424. For example, wireless device 402 can originate a group PTT call, and may provide an indication, for example, with a call request from wireless device 402, or related to the sending of media content from wireless device 402 to recipient wireless devices 406, 408 and 410, that wireless device 402 does not expect a response from the recipient wireless devices to group PTT call, or to the sending of the media content. As another example, wireless device 402 may provide an indication, for example, with a call request from wireless device 402, or related to the sending of media content, that wireless device 402 intends or requests that recipient wireless devices do not respond to the group PTT call, or to the sending of media content. The indication provided by wireless device 402 may be received by controller node 422.

Communication links 412, 414, 416, 418 and 420 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 400 to facilitate wireless communication but are omitted for clarity, such as access nodes (for example, base stations, base station controllers, and/or eNode B devices), routers, gateways, mobile switching centers, dispatch application processors, and location registers such as a home location register or visitor location register, and physical and/or wireless data links for carrying data among the various network elements.

Figure 5:
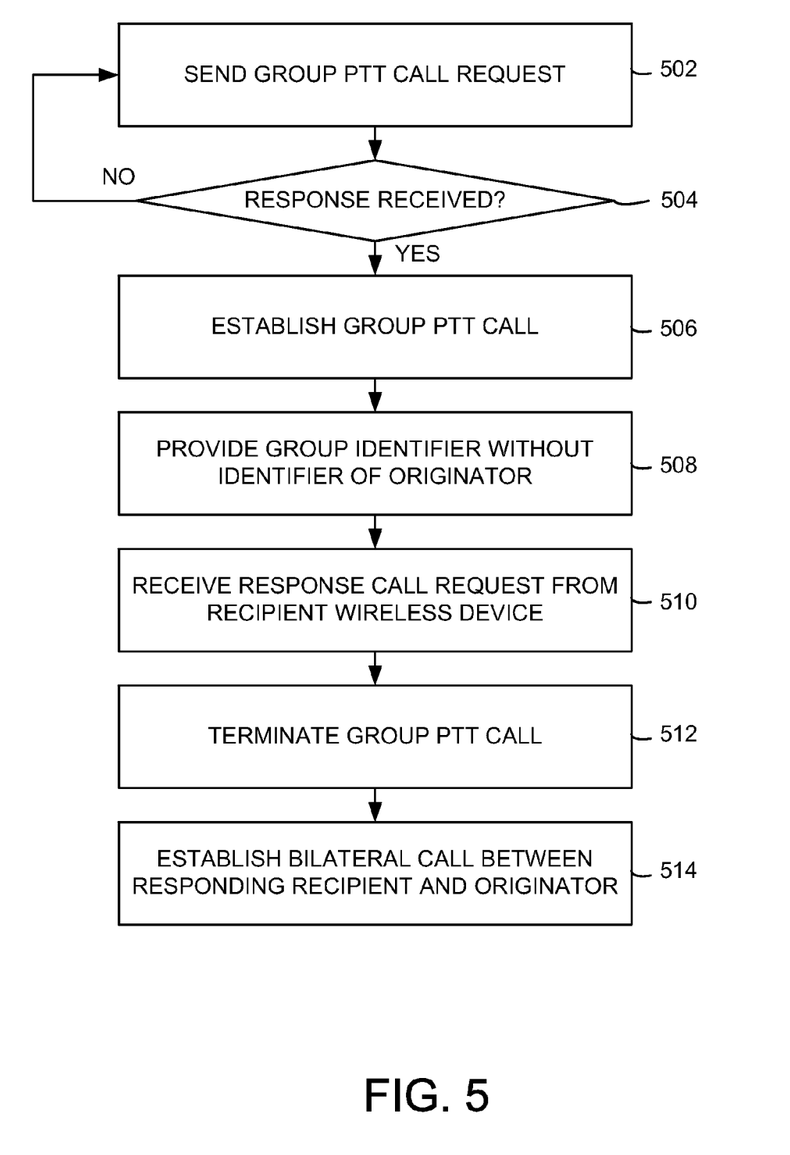
FIG. 5 illustrates another exemplary method of talk group communication.

FIG. 5 illustrates another exemplary method of talk group communication. In operation 502, a group PTT call request is sent. For example, a group PTT call request can be received from wireless device 402 and a group PTT call request can be sent to wireless device 406, 408 and 410 as recipient wireless devices. The call request can be, for example, to a group identifier indicating a call group of which wireless devices 406, 408 and 410 are members. It can be determined whether a response is received from each of the recipient wireless devices (operation 504), and the group PTT call request can be re-transmitted when a response is not received (operation 504—NO), for example, from a recipient wireless device within a period of time. When a response is received from each of the recipient wireless devices (operation 504—YES), the PTT group call can be established (operation 506).

In operation 508, a group identifier can be provided to the plurality of recipients indicating that the group PTT call involves the plurality of recipients without indicating an identifier of the originator. For example, the group identifier can be provided to wireless devices 406, 408 and 410, while an identifier of the originator, wireless device 402, is not provided to wireless devices 406, 408 and 410. The group identifier can be provided by controller node 422.

In an embodiment, originating wireless device 402 may also provide an indication (such as with a call request from wireless device 402, or related to the sending of the media content) that wireless device 402 does not expect a response to the call request or to the sending of the media content. As another example, wireless device 402 may provide an indication, for example, with a call request from wireless device 402, or related to the sending of the media content, that wireless device 402 intends or requests that recipient wireless devices 406, 408 and 410 do not respond to the call request or to the sending of the media content. The indication provided by wireless device 402 may be received by a network element of communication system 104, for example, a call controller, a gateway, or some other element of communication system 104. The indication provided by wireless device 102 may also be provided to recipient wireless device 106, 108 and 110.

In operation 510, a call request responsive to the group PTT call is received from one of the plurality of recipients. For example, a PTT call request can be received from one of wireless device 406, 408 and 410. The PTT call request can be received even though an indication was provided by wireless device 402 that a response is not expected, or that a wireless device 402 requests that a response not be sent. Because an identifier of the originator was not provided, the PTT call request from wireless device 406, 408 or 410 typically comprises the group identifier. However, a network element of communication system 400, such as controller node 422, can store, for example, information indicating that wireless device 402 was the originator of the group PTT call to which the PTT call request from wireless device 406, 408 or 410 is responsive. In an embodiment, any reply which may be sent by one of the recipient wireless devices can be limited to originating wireless device 402.

In operation 512, the group PTT call is terminated. In an embodiment, when the group PTT call is terminated, each of the one-on-one communication sessions with each of wireless device 402, 406, 408 and 410 are terminated.

In operation 514, a bilateral call is established between the responding recipient and the originator. For example, when a PTT call request is received from wireless device 406, a bilateral, full duplex communication session can be established between wireless device 406 and wireless device 402. Establishing a bilateral call or a bilateral communication session can prevent the establishment of a second PTT group call, and can preserve the network resources that would otherwise be committed to establishing a second group PTT call among the call group.

Figure 6:
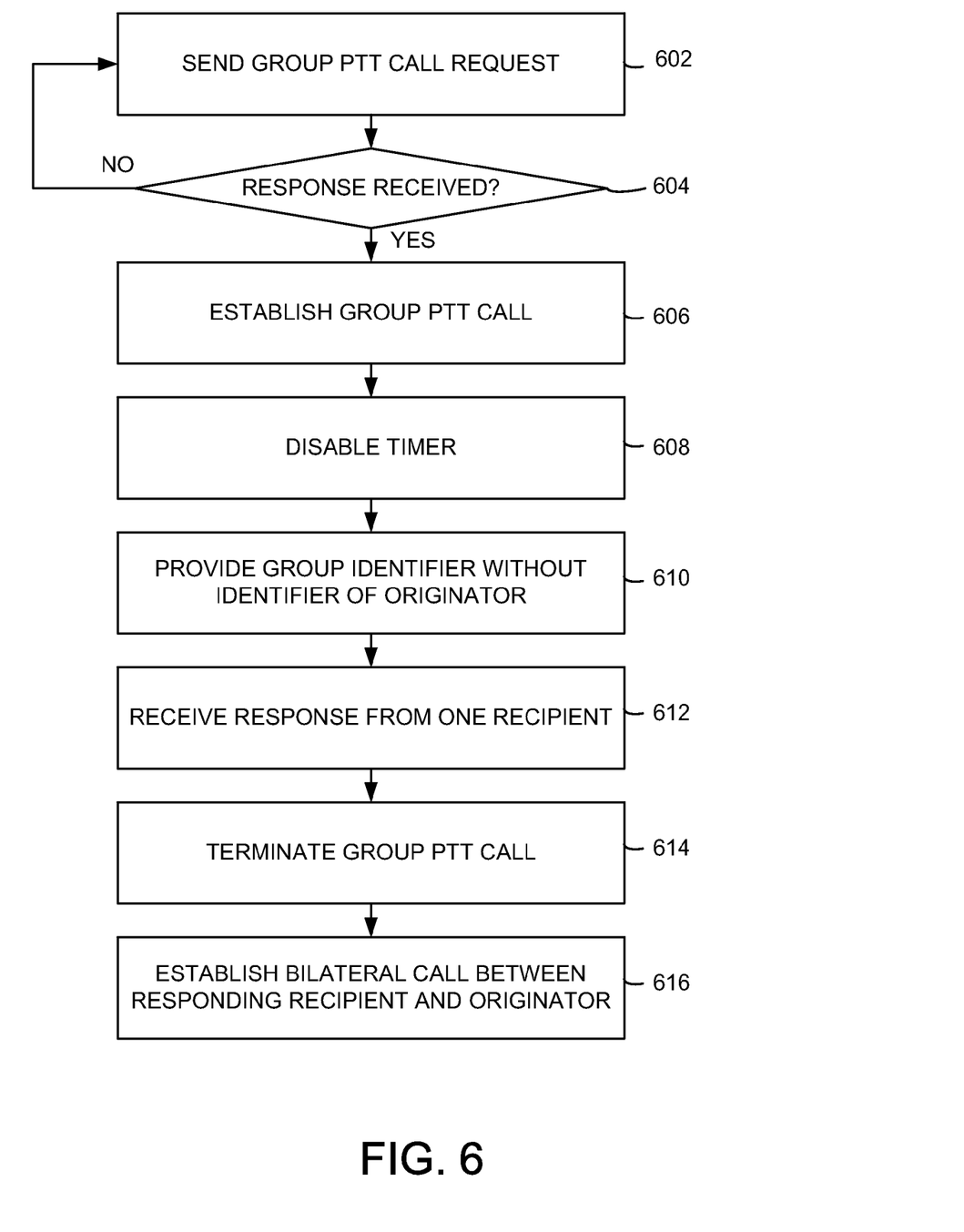
FIG. 6 illustrates another exemplary method of talk group communication.

FIG. 6 illustrates another exemplary method of talk group communication. In operation 602, a group PTT call request is sent. For example, a call request can be received from wireless device 402 and a group PTT call request can be sent to wireless device 406, 408 and 410 as recipient wireless devices. The call request can, for example, use a group identifier indicating a call group of which wireless devices 406, 408 and 410 are members. It can be determined whether a response is received from each of the recipient wireless devices (operation 604), and the group PTT call request can be re-transmitted when a response is not received to the PTT call request, for example, from a recipient wireless device within a period of time (operation 604—NO). When a response is received from each of the recipient wireless devices (operation 604—YES), the PTT group call can be established (operation 606).

In operation 608, a timer can be disabled. In an embodiment, controller node 422 can comprise timer 424. Timer 424 can measure a time that a group PTT call is established, and can provide an indication to call controller 422 when a predetermined period of time elapses without any communication occurring in an established group PTT call. While a group PTT call can be terminated when timer 424 provides the indication to controller node 422, controller node 422 can be configured to disregard the indication from timer 424. Controller node 422 can also be configured to disable timer 424. For example, wireless device 402 can originate a group PTT call, and may provide an indication, for example, with a call request from wireless device 402, that wireless device 402 expects only one response from among wireless devices 406, 408 and 410 based on the established PTT group call.

In operation 610, a group identifier is provided to the plurality of recipients indicating that the group PTT call involves a call group comprising the originator and the plurality of recipients without indicating an identifier of the originator. For example, the group identifier can be provided to wireless devices 406, 408 and 410, while an identifier of the originator, wireless device 402, is not provided to wireless devices 406, 408 and 410.

In operation 612, a response to the group PTT call is received from one of the plurality of recipients. For example, a response to the group PTT call can be received from one of wireless device 406, 408 and 410. Because an identifier of the originator was not provided, the response to the group PTT call from wireless device 406, 408 or 410 may comprise the group identifier. However, a network element of communication system 400, such as controller node 422, can store, for example, information indicating that wireless device 402 was the originator of the group PTT call on which the response from wireless device 406, 408 or 410 is based. The response can comprise an acknowledgement to a message from a recipient wireless device to the originator wireless device. The response can also comprise a response to a media file or streaming media content sent by the originating wireless device. The response can also comprise an answer to a question asked by the originator. The response can also comprise an identifier of a recipient wireless device, or a location of a recipient wireless device. Other responses are also possible.

In operation 614, the group PTT call is terminated. In an embodiment, when the group PTT call is terminated, each of the one-on-one communication sessions with each of wireless device 402, 406, 408 and 410 are terminated. In an embodiment, the group PTT call can be terminated following the receipt of a response from one of the recipient wireless devices. Upon receiving the response, the group PTT call can be terminated. In an embodiment, the communication session between wireless device 402 and each of wireless devices 406, 408 and 410 can be terminated individually after the receipt of the response. The response can comprise a PTT call request from a recipient wireless device, or the response can comprise another message responsive to the established group PTT call.

In operation 616, a bilateral call is established between the responding recipient and the originator. For example, when a PTT call request is received from wireless device 406, a bilateral, full duplex communication session can be established between wireless device 406 and wireless device 402. Establishing a bilateral call or a bilateral communication session can prevent the establishment of a second group PTT call, and can preserve the network resources that would otherwise be committed to establishing a second group PTT call among the call group.

Figure 7:
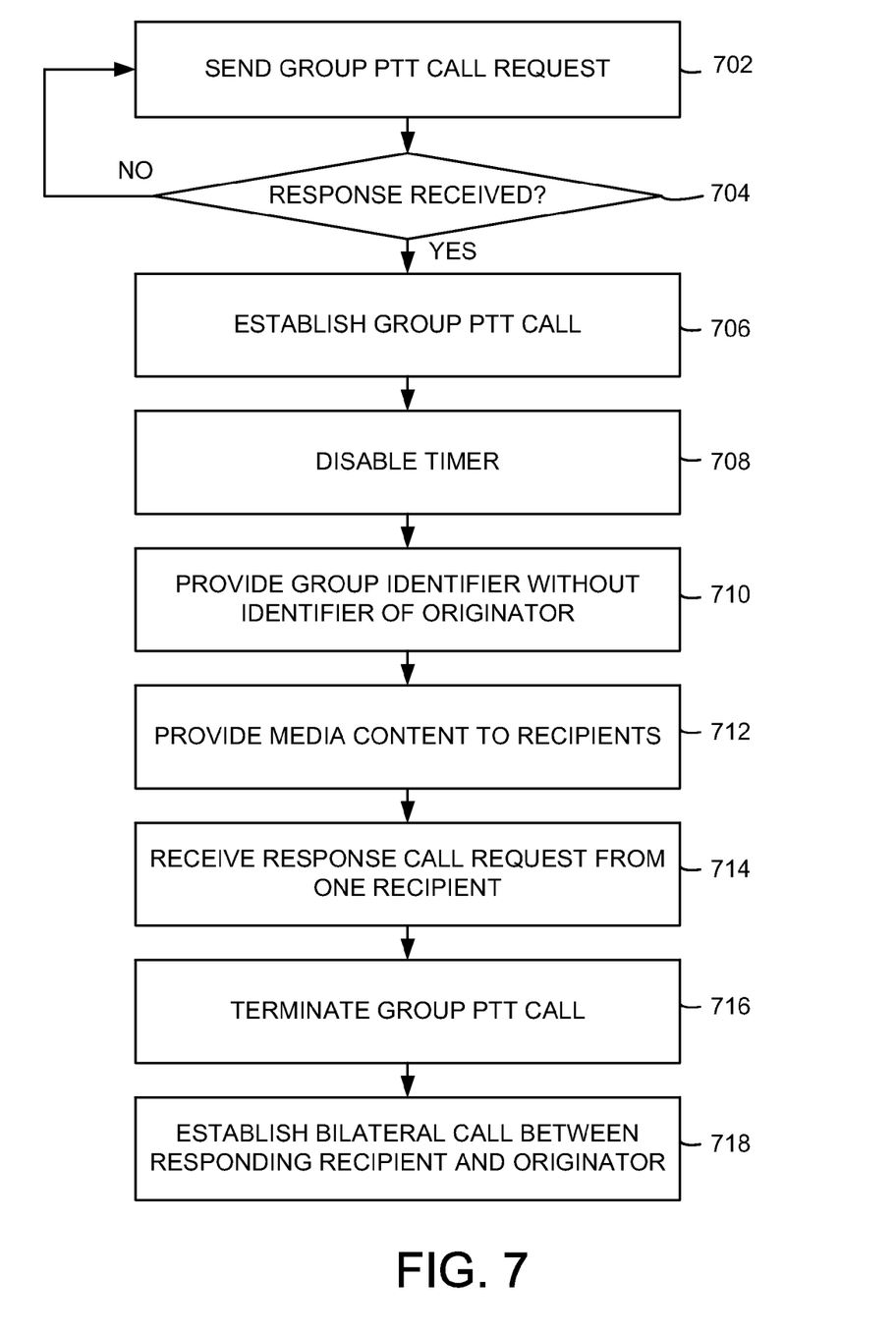
FIG. 7 illustrates another exemplary method of talk group communication.

FIG. 7 illustrates another exemplary method of talk group communication. In operation 702, a group PTT call request is sent. For example, a call request can be received from wireless device 402 and a group PTT call request can be sent to wireless devices 406, 408 and 410 as recipient wireless devices. The call request can be, for example, to a group identifier indicating a call group of which wireless devices 406, 408 and 410 are members. It can be determined whether a response is received from each of the recipient wireless devices (operation 704), and the group PTT call request can be re-transmitted when a response is not received, for example, from a recipient wireless device within a period of time (operation 704—NO). When a response is received from each of the recipient wireless devices (operation 704—YES), the PTT group call can be established (operation 706).

In operation 708, a timer can be disabled. In an embodiment, controller node 422 can comprise timer 424. Timer 424 can measure a time that a group PTT call is established, and can provide an indication to call controller 422 when a predetermined period of time elapses without any communication occurring in an established group PTT call. While a group PTT call can be terminated when timer 424 provides the indication to controller node 422, controller node 422 can be configured to disregard the indication from timer 424. Controller node 422 can also be configured to disable timer 424. For example, wireless device 402 can originate a group PTT call, and may provide an indication, for example, with a call request from wireless device 402, that wireless device 402 expects only one response from among recipient wireless devices 406, 408 and 410, and based on the indication from wireless device 402, controller node 422 can instruct the disabling of timer 424 or the disregarding of a timer indication from timer 424.

In operation 710, a group identifier is provided to the plurality of recipients indicating that the group PTT call involves a call group comprising the originator and the plurality of recipients without indicating an identifier of the originator. For example, the group identifier can be provided to wireless devices 406, 408 and 410, while an identifier of the originator, wireless device 402, is not provided to wireless devices 406, 408 and 410.

In operation 712, the originating wireless device can send media content to the recipient wireless devices. For example, wireless device 402 can send media content to recipient wireless device 406, 408 and 410 during the group PTT call. In an embodiment, wireless device 402 can originate a group PTT call, and may provide an indication, for example, with a call request from wireless device 402, related to the sending of the media content, that wireless device 402 expects only one response from any of the recipient wireless devices 406, 408 and 410. In an embodiment, the disabling of timer 424 (or the disregarding of a timer indication from timer 424) can be based on receiving the indication from wireless device 402 that no response is expected and/or that wireless device requests or intends that the recipient wireless devices do not provide any response to the group PTT call.

Media content can comprise audio, video, multimedia, or other information in digital form. Media content can comprise a discrete file which can be received by a recipient wireless device in its entirety and presented at the recipient wireless device. media content can also comprise "streamed" information, where presentation of the media content can begin at a recipient wireless device when a portion of the media content is received, and while a second portion of the media content has not yet been received. In an embodiment, the sending of the media content by originating wireless device 402 can be a broadcast of the media content to the recipient wireless devices 406, 408 and 410. In an embodiment, the receipt of the group identifier without an identifier of the originating wireless device can indicate that the media content is being sent to a group (such as the call group).

In operation 714, a response to the group PTT call is received from one of the plurality of recipients. For example, a response to the group PTT call can be received from one of wireless device 406, 408 and 410. Because an identifier of the originator was not provided, the response to the group PTT call from wireless device 406, 408 or 410 may comprise the group identifier. However, a network element of communication system 400, such as controller node 422, can store, for example, information indicating that wireless device 402 was the originator of the group PTT call on which the response from wireless device 406, 408 or 410 is based.

In operation 716, the group PTT call is terminated. In an embodiment, when the group PTT call is terminated, each of the one-on-one communication sessions with each of wireless device 402, 406, 408 and 410 are terminated. In an embodiment, the group PTT call can be terminated following the receipt of a response from one of the recipient wireless devices. Upon receiving the response, the group PTT call can be terminated. In an embodiment, the communication session between wireless device 402 and each of wireless devices 406, 408 and 410 can be terminated individually after the receipt of the response. The response can comprise a PTT call request from a recipient wireless device, or the response can comprise another message responsive to the established group PTT call.

In operation 718, a bilateral call is established between the responding recipient and the originator. For example, when a PTT call request is received from wireless device 406, a bilateral, full duplex communication session can be established between wireless device 406 and wireless device 402. Establishing a bilateral call or a bilateral communication session can prevent the establishment of a second group PTT call, and can preserve the network resources that would otherwise be committed to establishing a second group PTT call among the call group.

Figure 8:
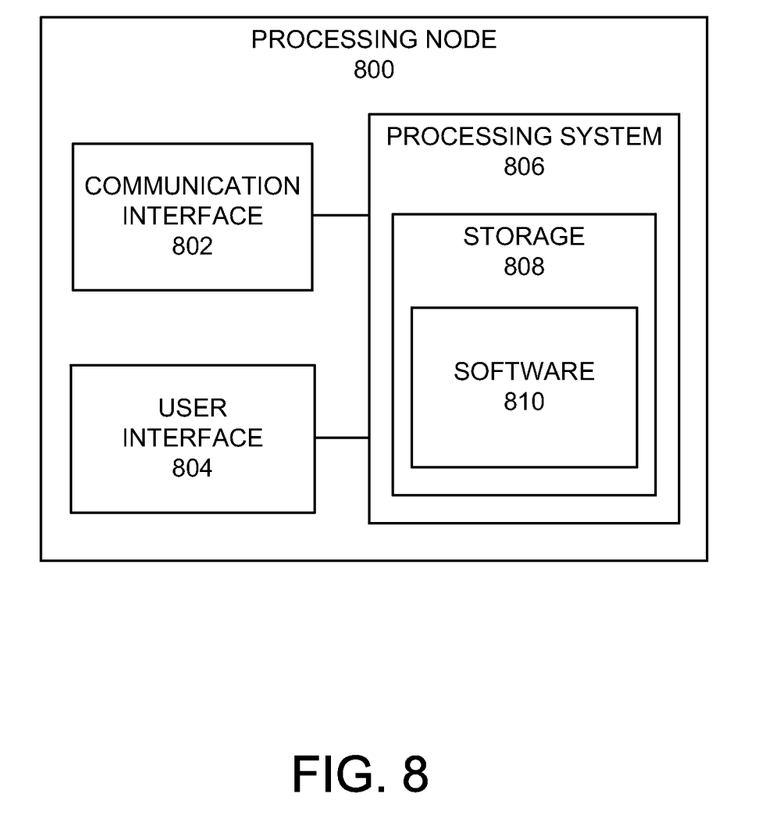
FIG. 8 illustrates an exemplary processing node.

FIG. 8 illustrates an exemplary processing node 800 in a communication system. Processing node 800 comprises communication interface 802, user interface 804, and processing system 806 in communication with communication interface 802 and user interface 804. Processing node 800 can be configured to carry out methods of talk group communication. Processing system 806 includes storage 808, which can comprise a disk drive, flash drive, memory circuitry, or other memory device. Storage 808 can store software 810 which is used in the operation of the processing node 800. Storage 808 may include a disk drive, flash drive, data storage circuitry, or some other memory apparatus. Software 810 may include computer programs, firmware, or some other form of machine-readable instructions, including an operating system, utilities, drivers, network interfaces, applications, or some other type of software. Processing system 806 may include a microprocessor and other circuitry to retrieve and execute software 810 from storage 808. Processing node 800 may further include other components such as a power management unit, a control interface unit, etc., which are omitted for clarity. Communication interface 802 permits processing node 800 to communicate with other network elements. User interface 804 permits the configuration and control of the operation of processing node 800.

Examples of processing node 800 include controller node 422. Processing node 800 can also be an adjunct or component of a network element. Processing node 800 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of talk group communication, comprising:
   establishing a group push-to-talk (PTT) call between an originator and a plurality of recipients, wherein the group PTT call comprises an individual communication session between the originator and each of the plurality of recipients;
   providing to the plurality of recipients a group identifier indicating that the group PTT call involves a call group comprising the originator and the plurality of recipients without indicating an identifier of the originator;
   terminating the group PTT call;
   receiving a response PTT call request from one of the plurality of recipients based on the group PTT call; and
   establishing a bilateral PTT call between the one of the plurality of recipients and the originator.

2. The method of claim 1, further comprising:
   providing to the plurality of recipients media content and a group identifier indicating the sending of the media content to the plurality of recipients without indicating an identifier of the originator.

3. The method of claim 1, further comprising:
   providing to the plurality of recipients media content and a group identifier indicating the sending of the media content to the plurality of recipients without indicating an identifier of the originator and without indicating an identifier of any recipients.

4. The method of claim 1, further comprising:
   terminating each individual communication session between the originator and each of the plurality of recipients when each of the plurality of recipients provides an indication that the media content has been received.

5. The method of claim 1, wherein the group PTT call further comprises unicast communication sessions between the originator and each of the plurality of recipients.

6. A method of talk group communication, comprising:
   establishing a group push-to-talk (PTT) call between an originator and a call group comprising a plurality of recipients wherein a timer is prevented from terminating the group PTT;
   providing to the plurality of recipients a group identifier indicating that the group PTT call involves the plurality of recipients without indicating an identifier of the originator;
   receiving a response call request from one of the plurality of recipients based on the group PTT call;

terminating the group PTT call with the plurality of recipients from which the response call request is not received; and establishing a bilateral PTT call between the one of the plurality of recipients and the originator.

7. The method of claim 6, wherein establishing further comprises:

sending a call request to establish a group PTT call between an originator and a call group comprising a plurality of recipients; and re-sending the call request to the plurality of recipients when a response call request is not received within a predetermined period of time.

8. The method of claim 6, further comprising:

providing to the plurality of recipients media content and a group identifier indicating the sending of the media content to the plurality of recipients without indicating an identifier of the originator.

9. The method of claim 6, further comprising:

providing to the plurality of recipients media content and a group identifier indicating the sending of the media content to the plurality of recipients without indicating an identifier of the originator and without indicating an identifier of any recipients.

10. The method of claim 6, wherein the group PTT call further comprises an individual communication session between the originator and each of the plurality of recipients.

11. A system for talk group communication, comprising:

a processing node, configured to establish a group push-to-talk (PTT) call between an originator and a plurality of recipients, wherein the group PTT call comprises unicast communication sessions between the originator and each of the plurality of recipients;

provide to the plurality of recipients a group identifier indicating that the group PTT call involves a call group comprising the originator and the plurality of recipients without indicating an identifier of the originator;

terminate the group PTT call;

receive a response PTT call request from one of the plurality of recipients based on the group PTT call; and establish a bilateral PTT call between the one of the plurality of recipients and the originator.

12. The system of claim 11, wherein the processing node is further configured to:

provide to the plurality of recipients media content and a group identifier indicating the sending of the media content to the plurality of recipients without indicating an identifier of the originator.

13. The system of claim 11, wherein the processing node is further configured to:

provide to the plurality of recipients media content and a group identifier indicating the sending of the media content to the plurality of recipients without indicating an identifier of the originator and without indicating an identifier of any of recipients.

14. The system of claim 11, wherein the group PTT call further comprises an individual communication session between the originator and each of the plurality of recipients.

15. The system of claim 14, wherein the processing node is further configured to:

terminate each individual communication session between the originator and each of the plurality of recipients when each of the plurality of recipients provides an indication that the media content has been received.

* * * * *